(12) United States Patent
Seo et al.

(10) Patent No.: US 12,709,685 B2
(45) Date of Patent: Aug. 18, 2026

(54) DECORATED PARTICLE, COMPOSITE MATERIAL INCLUDING THE SAME, AND METHODS OF MAKING THE SAME

(71) Applicant: 3M INNOVATIVE PROPERTIES COMPANY, St. Paul, MN (US)

(72) Inventors: Yongbeom Seo, Woodbury, MN (US); Matthew H. Frey, Cottage Grove, MN (US); Jacob P. Podkaminer, St. Paul, MN (US); Victor Ho, St. Paul, MN (US); Samuel J. Carpenter, Maplewood, MN (US); Audrey S. Forticaux, Minneapolis, MN (US); Lalitha V. N. R. Ganapatibhotla, Lake Elmo, MN (US); Taisiya Skorina, Woodbury, MN (US); Jeremy M. Higgins, Roseville, MN (US); Yangbin Chen, Lake Elmo, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 115 days.

(21) Appl. No.: 18/024,472

(22) PCT Filed: Sep. 3, 2021

(86) PCT No.: PCT/IB2021/058064
§ 371 (c)(1),
(2) Date: Mar. 2, 2023

(87) PCT Pub. No.: WO2022/053921
PCT Pub. Date: Mar. 17, 2022

(65) Prior Publication Data

US 2023/0323131 A1 Oct. 12, 2023

Related U.S. Application Data

(60) Provisional application No. 63/075,494, filed on Sep. 8, 2020.

(51) Int. Cl.
*C09C 1/40* (2006.01)
*C09C 3/06* (2006.01)
*C09K 5/14* (2006.01)

(52) U.S. Cl.
CPC ................ *C09C 1/407* (2013.01); *C09C 3/06* (2013.01); *C09K 5/14* (2013.01); *C01P 2006/16* (2013.01)

(58) Field of Classification Search
CPC .. C09K 5/14; C09C 1/40; C09C 1/402; C09C 1/405; C09C 1/407; C09C 3/06;
(Continued)

(56) References Cited

U.S. PATENT DOCUMENTS 2,026,862 A * 1/1936 Blumenfeld ............ C09C 3/063 106/439
3,466,142 A 9/1969 Hambly
(Continued)

FOREIGN PATENT DOCUMENTS

CA 3035935 A1 * 3/2018 ............ C09C 3/063
CN 106046862 A * 10/2016
(Continued)

OTHER PUBLICATIONS

International Search Report for PCT International Application No. PCT/IB2021/058064, mailed on Nov. 18, 2021, 5 pages.
(Continued)

*Primary Examiner* — Matthew R Diaz
(74) *Attorney, Agent, or Firm* — Ann Benjamin

(57) ABSTRACT

A decorated particle comprises a single inorganic particle core having an uneven outer surface with a plurality of crevices and an average particle diameter of 20 to 150 microns. A binder retaining decorating particles is disposed on at least a portion of the outer surface of the inorganic particle core and fills the crevices. The decorating particles
(Continued)

have an average particle diameter of 0.05 to 10 microns. A method of making decorated particles is also disclosed.

10 Claims, 5 Drawing Sheets

(58) Field of Classification Search
CPC ...... C09C 3/063; C09C 3/066; B01J 20/3293; B01J 20/3295
See application file for complete search history.

(56) References Cited

U.S. PATENT DOCUMENTS

| | | | | |
|---|---|---|---|---|
| 4,341,663 | A | 7/1982 | Derleth et al. | |
| 4,728,631 | A * | 3/1988 | Ogata | B41M 5/1246 427/151 |
| 6,800,684 | B2 * | 10/2004 | Hayashi | C09C 1/3692 523/210 |
| 7,264,672 | B1 * | 9/2007 | Trabzuni | C09C 1/3692 428/407 |
| 8,475,846 | B2 * | 7/2013 | Jones | C09C 1/0015 424/490 |
| 8,658,039 | B2 * | 2/2014 | Linford | B01J 20/3295 210/656 |
| 8,663,506 | B2 * | 3/2014 | Chandrasekhar | C09K 5/14 252/500 |
| 9,371,425 | B2 * | 6/2016 | Rose | C09C 1/407 |
| 9,550,888 | B2 | 1/2017 | Lodyga et al. | |
| 9,707,734 | B2 * | 7/2017 | Vucak | C09C 1/021 |
| 10,227,496 | B2 * | 3/2019 | Minami | H01B 1/22 |
| 2006/0135655 | A1 | 6/2006 | Miller | |
| 2007/0026221 | A1 * | 2/2007 | Stevens | C09K 5/14 428/308.8 |

FOREIGN PATENT DOCUMENTS

| | | | | |
|---|---|---|---|---|
| GB | 2278114 | A * | 11/1994 | C09C 3/063 |
| GB | 2278114 | B | 5/1996 | |
| JP | 2004-59851 | A | 2/2004 | |
| JP | 2015-149476 | A | 8/2015 | |
| JP | 2016175953 | A * | 10/2016 | |
| WO | 2009/105350 | A1 | 8/2009 | |
| WO | WO-2013039103 | A1 * | 3/2013 | C01B 21/064 |
| WO | 2019235234 | A1 | 12/2019 | |

OTHER PUBLICATIONS

Pfeffer, “Synthesis of Engineered Particulates With Tailored Properties Using Dry Particle Coating”, Powder Technology, 2001, vol. 117, pp. 40-67.

Shi, “Formation of Monosized Spherical Aluminum Hydroxide Particles by Urea Method”, Solid State Ionics, 1989, vol. 32, No. 33, pp. 537-543.

* cited by examiner

DECORATED PARTICLE, COMPOSITE MATERIAL INCLUDING THE SAME, AND METHODS OF MAKING THE SAME

CROSS REFERENCE TO RELATED APPLICATIONS

This application is a national stage filing under 35 U.S.C. 371 of PCT/IB2021/058064, filed Sep. 3, 2021, which claims the benefit of Provisional Application No. 63/075,494, filed Sep. 8, 2020, the disclosure of which is incorporated by reference in its/their entirety herein.

TECHNICAL FIELD

The present disclosure broadly relates to fillers, composite materials and methods of making and using them.

BACKGROUND

Inorganic particulates such as, for example, calcium carbonate and silica are widely used as fillers in composite articles. However, the incorporation of inorganic filler particles into polymer composites at high loading (e.g., volume percentage) in those polymers leads to compromises in other desirable properties (e.g., mechanical compliance) and processability (e.g., as caused by high viscosity).

Thermal interface materials (TIMs) are placed at the interfaces between heat sources and heat sinks to reduce the thermal resistance of those interfaces. Examples of heat sources are electric vehicle batteries during charging and discharging, electronic components such as integrated circuits (ICs) and IC packages, and electromechanical devices such as electric machines (e.g., motors). The effectiveness of such TIMs depends on their thermal conductivity, as well as intimate and conformal contact with the surfaces of the source and sink. To achieve conformal contact, TIMs typically include a polymeric component. To achieve high thermal conductivity, TIMs typically include an inorganic component. Hence, common TIMs are inorganic particle filled polymer matrix composites.

SUMMARY

The maximum practically achievable thermal conductivity of TIM composite materials is limited by the extent to which thermal filler particles negatively impact tradeoff properties and processability. Thus, there is a need in the art for improved filler particles in terms of their positive impact on thermal conductivity relative to their negative impact on tradeoff properties and processability (e.g., viscosity).

The present disclosure provides decorated thermal filler particles, polymer-matrix composites that incorporate the decorated thermal filler particles, and methods of making each. Advantageously, the decorated thermal filler particles can be present at high volume fraction in thermally conductive polymer composites that are relatively easy to process.

In a first aspect, the present disclosure provides a decorated particle comprising:

- a single inorganic particle core having an average particle diameter of 20 to 150 microns, and wherein the inorganic particle core has an uneven outer surface with crevices;
- a first binder retaining decorating particles disposed on at least a portion of the outer surface of the inorganic particle core and filling the crevices, wherein the decorating particles have an average particle diameter of 0.05 to 10 microns.

In a second aspect, the present disclosure provides a composite material comprising a plurality of decorated particles according to the present disclosure retained in a second binder, wherein the second binder is distinguishable from the first binder.

In a third aspect, the present disclosure provides a method for making a decorated particle, the method comprising:

combining:

- an inorganic particle core having an average particle diameter of 20 to 150 microns, and wherein the inorganic particle core has an uneven outer surface with crevices;
- a curable first binder precursor; and
- decorating particles, wherein the decorating particles have an average particle diameter of 0.05 to 10 microns; and curing the curable first binder precursor to form a first binder, thereby forming the decorated particle.

As used herein:

The term “crevice” refers to a narrow crack or opening; a fissure; or cleft.

The term “cleft” refers to a hollow between ridges or protuberances; a crack.

The term “thermally conductive” means having a thermal conductivity of at least 0.5 watt per meter-kelvin (i.e., W/mK or equivalently $W \cdot m^{-1}K^{-1}$) at 50° C.

Features and advantages of the present disclosure will be further understood upon consideration of the detailed description as well as the appended claims.

Figure 1:
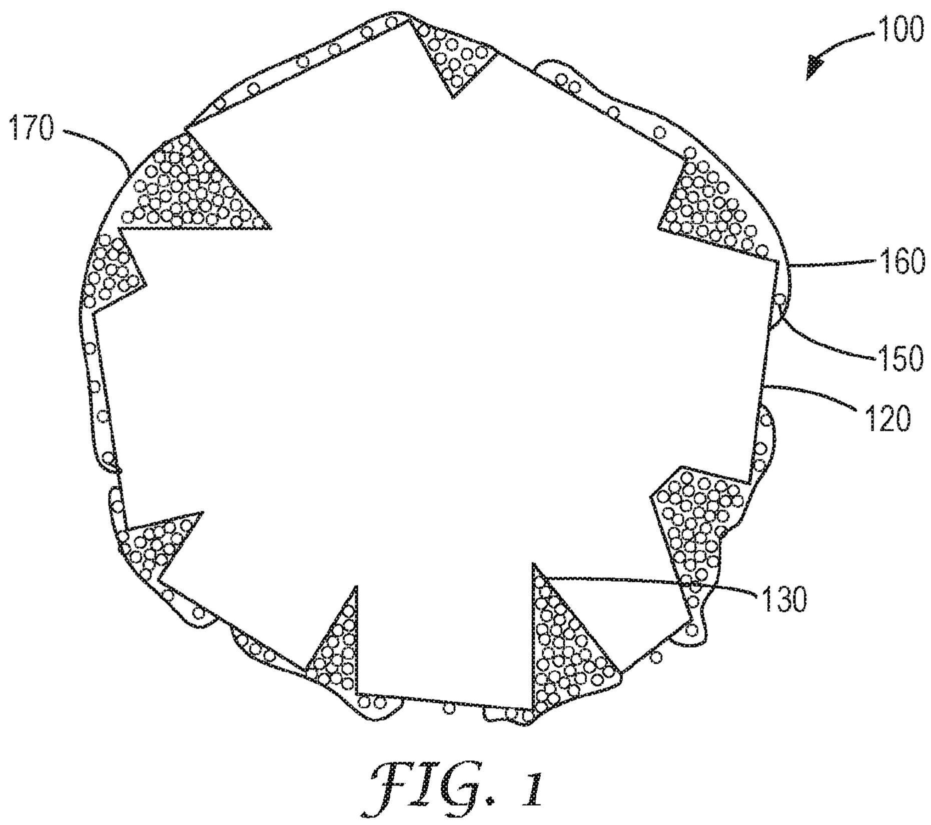
FIG. 1 is a schematic cross-sectional view of an exemplary decorated particle 100 according to one embodiment of the present disclosure.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DETAILED DESCRIPTION

Referring now to FIG. 1, decorated particle 100 comprises a single inorganic particle core 110 having an average particle diameter of 20 to 150 microns. Inorganic particle core 110 has an uneven outer surface 120 with crevices 130 therein. At least partial layer 140 comprises a first binder 160 retaining decorating particles 150 disposed in crevices 130. The decorating particles 150 have an average particle diameter of 0.05 to 10 microns. In the embodiment shown, the outer surface 170 of decorated particle 110 is smoother than the outer surface 120 of the inorganic particle core 110.

As used herein, the term "average particle diameter" refers to average particle diameter that can be measured, for example, according to ASTM Test Method E2651-19 "Standard Guide for Powder Particle Size Analysis" (2019), ASTM International, West Conshohocken, Pennsylvania, and references cited therein.

Smoothness can be measured in terms of the number and severity of angular features that can frictionally interact with neighboring particles. These frictional interactions can cause viscosity to increase in compositions containing the decorated particles. Smoothness of the decorated particle and inorganic particle core may be determined by form factor and roundness according to ASTM F1877-16 "Standard Practice for Characterization of Particles" (2016), ASTM International, Conshohocken, Pennsylvania. The inorganic particle core may comprise any inorganic material capable of having crevices in its surface including, for example, inorganic materials such as inorganic oxides and hydroxides (e.g., aluminum oxide, magnesium oxide, aluminum trihydroxide, zinc oxide, silicon oxide, beryllium oxide, titanium oxide, copper oxide, cuprous oxide), inorganic nitrides (e.g., silicon nitride, aluminum nitride, boron nitride), carbides (e,g, silicon carbide), diamond, talc, mica, kaolin, bentonite, magnesite, pyrophyllite, titanium boride, calcium titanate, metals and their alloys (e.g., copper, aluminum, brass, steel, bronze), and combinations thereof. Boron nitride may have any structure, such as c-BN (cubic structure), w-BN (wurtzite structure), h-BN (hexagonal structure), r-BN (rhombohedral structure), or t-BN (tutbostratic structure). Among these, from the perspectives of thermal conductivity and cost, aluminum oxide, aluminum hydroxide, zinc oxide, boron nitride, and aluminum nitride are often preferred.

In many preferred embodiments, the inorganic particle core comprises at least one thermally conductive inorganic material. In many preferred embodiments, the inorganic particle core is thermally conductive. Aluminum trihydroxide is especially useful as the inorganic particle core; however, this is not a requirement.

The inorganic particle core has an average particle size of 20 to 150 microns. In some embodiments, the average particle size is from 30 to 150 microns, 40 to 150 microns, 50 to 160 microns, 60 to 150 microns, 70 to 150 microns, 80 to 150 microns, 90 to 150 microns, or even 100 to 150 microns. In some embodiments, the average particle size is from 20 to 140 microns, 20 to 130 microns, 20 to 120 microns, 20 to 110 microns, 20 to 100 microns, 20 to 90 microns, 20 to 80 microns, or even 20 to 70 microns. In some embodiments, the average particle size is from 30 to 140 microns, 40 to 130 microns, 50 to 120 microns, 60 to 110 microns, or 70 to 100 microns.

Suitable inorganic cores can be readily obtained from commercial vendors, and optionally processed (e.g., milled and/or classified) to provide a desired average particle size.

The decorating particles may comprise organic and/or inorganic material. Exemplary materials suitable for use as decorating particles include those listed above as being suitable for use as the inorganic core as well as graphite, carbon black, graphene, and combinations thereof.

In many preferred embodiments, the decorating particles comprise at least one thermally conductive inorganic material. In many preferred embodiments, the decorating particles are thermally conductive. Aluminum trihydroxide, aluminum oxide, and boron nitride are especially useful as the decorating particles; however, this is not a requirement.

The decorating particles and the inorganic particle core may comprise the same or different material.

The decorating particles have an average particle size of 0.05 to 10 microns. In some embodiments, the average particle size is from 0.3 to 10 microns, 1 to 10 microns, 3 to 10 microns, 5 to 10 microns, or even 7 to 10 microns. In some embodiments, the average particle size is from 0.05 to 8 microns, 0.05 to 7 microns, 0.05 to 5 microns, or even 0.05 to 3 microns. In some embodiments, the average particle size is from 0.3 to 9 microns, or from 0.5 to 7 microns.

Suitable decorating particles can be readily obtained from commercial vendors, and optionally processed (e.g., milled and/or classified) to provide a desired average particle size.

Suitable binders for the first binder may be inorganic and/or organic. Examples of inorganic binders include lithium silicate, sodium silicate (waterglass), and combinations thereof. Examples of organic binders include at least partially cured curable resins. Suitable curable resins may include, for example, epoxy resins, urethane resins, ring-opening metathesis polymerization (ROMP) cycloolefin resins, isocyanurate resins, free-radically polymerizable resins (e.g., mono- and/or polyfunctional acrylates, methacrylates, acrylamides, vinyl ethers, and/or maleates), phenolic resins, urea-formaldehyde resins, aminoplast resins, silicone resins, and self-crosslinking polymer latexes. In some cases, a curative such as, for example, a free-radical initiator (thermal initiator or photoinitiator), amine crosslinker, and/or acid catalyst is typically used in combination with the curable resin. The selection of a curative and relative amounts to be used, as well as curing conditions, are within the capabilities of those of ordinary skill in the art.

In some embodiments, the organic binders may include preformed organic polymers added as a solution. Suitable organic polymers is selected from the groups consisting of acrylic polymers, polyolefins, styrenic polymers, silicones, polyurethanes, polyethers, polyamines, polyamides, polyesters, and combinations thereof.

Decorated particles according to the present disclosure can be made, for example, by: mixing core particle, decorating particles and a first curable binder precursor; spray drying the mixture and heating (or irradiating in the case of a photocatalyst or photoinitiator) the resulting spray-dried particles to cure the first curable binder precursor. The resultant decorated particles can be purified and classified if desired.

In some embodiments, the decorated particles have a narrow particle size distribution. For example, the decorated particles may have a size distribution with a span of less than or equal to 0.1. Span is defined as the quantity $(D_{90}-D_{10})/D_{50}$, wherein $D_{90}$ refers to the particle size in the size distribution, up to and including which, 90 percent of the total volume of material in the sample is contained. Similarly, $D_{50}$ refers to the particle size in the size distribution, up to and including which, 50 percent of the total volume of material in the sample is contained, and $D_{10}$ is that particle size below which 10 percent by volume of the material is contained. $D_{10}$, $D_{50}$, and $D_{90}$ may be determined, for example, laser diffraction or microscopic inspection.

Decorated particles according to the present disclosure include a first binder retaining decorating particles disposed on at least a portion of an uneven outer surface of an inorganic particle core and filling crevices of the uneven surface of the inorganic particle core. What is meant by an uneven outer surface of an inorganic particle is that the outer surface includes a combination of adjacent relative protrusions and intrusions. The intrusions can be in the form of crevices. Filling a crevice means that the first binder retaining decorating particles occupies (i.e., fills) the volume of the crevice.

In some embodiments, the first binder retaining decorating particles may just fill one (i.e. level-filled) or more crevices, leaving the outer surface adjacent to the crevice(s) of the inorganic particle core exposed.

In some embodiments, the first binder retaining decorating particles may overfill one or more crevice, thus further covering the outer surface of the inorganic particle core adjacent to the crevice(s). This condition of a decorated particle is referred to herein as one where the crevice(s) is/are overfilled.

In some embodiments of the decorated particle, the decorating particles are completely surrounded by first binder.

The decorating particles may independently be fully or partially immersed in the first binder.

Figure 2:
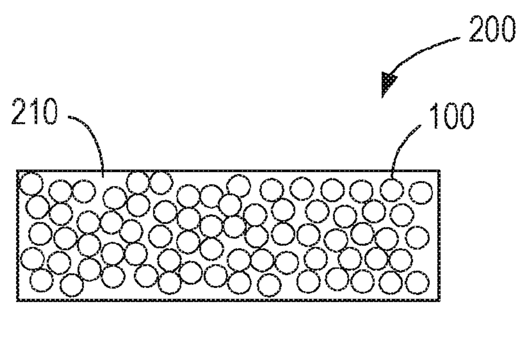
FIG. 2 is a schematic cross-sectional view of an exemplary composite material 200 according to one embodiment of the present disclosure.

Referring now to FIG. 2, composite material 200 comprises a plurality of decorated particles 100 retained in a second binder 210. The second binder 210 is distinguishable from the first binder of the decorated particles, either physically and/or compositionally.

In some cases, the composite material is flowable (e.g., grease, putty, or paste) and/or melt-flowable (e.g., extrudable hot melt adhesive).

The second binder may be a cured curable second binder precursor such as those recited for the curable first binder precursor hereinabove, or it may be a solidified thermoplastic polymer, for example. Exemplary thermoplastic polymers include polyolefins, polyesters, thermoplastic polyurethanes, polycarbonates, acrylic polymers (e.g., polymethyl methacrylate, polyethyl acrylate, polyacrylonitrile), and polyamides. Additional second binders include hydrocarbon greases and gels, and silicone greases and gels. In some embodiments, the second binder comprises a pressure-sensitive adhesive and/or a hot melt adhesive.

The amount of decorated particles in the composite material may be any amount greater than zero. For example it may be at least 5 percent, at least 10 percent, at least 20 percent, at least 30 percent, at least 40 percent, at least 50 percent, at least 60 percent, or even at least 70 percent. For thermal management compositions (e.g., where in the decorated particles are used as thermal filler particles. High loading levels of the decorated particles in the second binder are often desirable where they are added for the purpose of thermal management.

Composite materials according to the present disclosure may be prepared by mixing decorated particles with a molten binder that cools and hardens (e.g., an extruded thermoplastic), or they may be prepared by mixing the decorated particles with a curable second binder precursor and then at least partially curing the curable second binder precursor, for example. Suitable mixing devices and techniques are well known in the art.

Composite materials according to the present disclosure may contain secondary particles. For example, if the decorated particles are thermally conductive, then the secondary particles may also be thermally conductive. Exemplary thermally conductive secondary particles include particles comprising at least one of aluminum oxide (alumina), magnesium oxide, aluminum hydroxide, silicon nitride, zinc oxide, silicon oxide, beryllium oxide, titanium oxide, copper oxide, cuprous oxide, boron nitride, aluminum nitride, silicon carbide, diamond, talc, mica, kaolin, bentonite, magnesite, pyrophyllite, titanium boride, calcium titanate, metal (e.g., copper, aluminum, brass, steel, bronze), graphite, carbon black, graphene, and combinations thereof. Other thermally conductive materials may also be used.

The composite material may be useful as thermally conductive sealers, thermally conductive tapes and sheets, thermally conductive putties, and thermally conductive pastes.

In some embodiments, the composite material has a thermal conductivity of at least 0.5 $Wm^{-1}K^{-1}$ (also W/mK), at least 1 $Wm^{-1}K^{-1}$, at least 2 $Wm^{-1}K^{-1}$, at least 2.5 $Wm^{-1}K^{-1}$, at least 5 $Wm^{-1}K^{-1}$, at least 10 $Wm^{-1}K^{-1}$, at least 15 $Wm^{-1}K^{-1}$, at least at least 20 $Wm^{-1}K^{-1}$, or even at least at least 30 $Wm^{-1}K^{-1}$, although lower thermal conductivities may also be used.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

TABLE 1

| DESIGNATION | DESCRIPTION AND SOURCE |
|---|---|
| SB93 | Aluminum trihydroxide (ATH, $D_{50}$ = 105 microns), commercially available as SB93 from Nippon Light Metal, Tokyo, Japan |
| B53 | ATH ($D_{50}$ = 55 microns), commercially available as B53 from Nippon Light Metal |
| BF083 | ATH ($D_{50}$ = 10 microns), commercially available as BF083 Nippon Light Metal |
| BF013 | ATH ($D_{50}$ = 1 micron), commercially available as BF013 from Nippon Light Metal |
| KH101 | ATH ($D_{50}$ = 1 micron), commercially available as KH-101 from KC, Yeongam-gun, Jeonnam, South Korea |
| A110 | ATH ($D_{50}$ = 10 microns), commercially available as MOLDX A110 from Huber, Atlanta, Georgia |
| BAK10 | Alumina ($Al_2O_3$, $D_{50}$ = 10 microns), commercially available as BAK10 from Shanghai Bestry Performance Materials Co., Shanghai, China |
| BAK2 | Alumina ($Al_2O_3$, $D_{50}$ = 2 microns), commercially available from BAK2 Shanghai Bestry Performance Materials Co. |
| TM1250 | Alpha alumina ($Al_2O_3$, $D_{50}$ = 2 microns), commercially available as MARTOXID TM-1250 from Huber |

TABLE 1-continued

| DESIGNATION | DESCRIPTION AND SOURCE |
| --- | --- |
| CFP0075 | Boron nitride flake (BN, $D_{50}$ = 7.5 microns), commercially available as CFP0075 from 3M Company, St. Paul, Minnesota |
| DER332 | Bisphenol A diglycidyl ether, Epoxy-Resin, commercially available as D.E.R. 332 from Palmer Holland, North Olmsted, Ohio |
| TEPA | Tetraethylenepentamine (TEPA), available from BASF, Florham Park, New Jersey |
| HDDA | hexanediol diacrylate (HDDA), available as SR 238 from Arkema, King of Prussia, Pennsylvania |
| EHA | ethylhexyl acrylate (EHA), available from BASF |
| AIBN | Azobisisobutyronitrile (AIBN), available from Sigma Aldrich, Saint Louis, Missouri |
| LITHISIL | Potassium lithium silicate solution in water, wt. ratio $SiO_2/K_2O + Li_2O$ = 2.5, available as LITHISIL829 from PQ Corporation, Malvern, Pennsylvania |
| SYLGARD ® 184 | Polydimethylsiloxane elastomer (PDMS), available as MARTOXID TM-1250 from Dow Chemical, Midland, Michigan |
| RICON | low molecular weight polybutadiene functionalized with maleic anhydride, available as RICON 130MA8 from Cray Valley USA, Exton, Pennsylvania |
| EFKA PL 5635 | Acid scavenger, available as EFKA PL 5635 from BASF |
| R805 | Fumed silica, available as AEROSIL R805 from Aerosil, Parsippany, New Jersey |
| PRIPOL 2033 | Dimer diol, available as PRIPOL 2033 from Croda, Edison, New Jersey |
| FARMIN D2098 | N,N-dimethyldodecylamine, available as FARMIN D2098 from Kao Chemicals, High Point, North Carolina |
| BYK108 | Hydroxy functional carboxylic acid ester, available as BYK 108 from BYK, Wallingford, Connecticut |

Test Methods

Scanning Electron Microscopy

Materials were sprinkled on double-sided carbon tape that was affixed to an aluminum sample stub. These specimens were sputter coated for 60 second with material from a Pd—Au target. The specimens were analyzed using a Hitachi TM-3000 tabletop scanning electron microscope (Hitachi High Technologies, Inc., Tokyo, Japan) using the analysis mode for the voltage setting.

Form Factor and Roundness Measurement

Form Factor and Roundness of particles were analyzed using ImageJ software (Rasband, W. S., ImageJ, U. S. National Institutes of Health, Bethesda, Maryland, USA, https://imagej.nih.gov/ij/, 1997-2018) with scanning electron microscopy images following the ImageJ User Guide, which is consistent with ASTM F1877-16 "Standard Practice for Characterization of Particles".

Thermal Conductivity Measurement Method 1—LFA

The thermal conductivities were obtained by Laser Flash Analysis (LFA, 467 HyperFlash, commercially available from Netszch, Selb, Germany) following ASTM E1461-13 "Standard Test Method for Thermal Diffusivity by the Flash Method" (2013) ASTM International, West Conshohocken, Pennsylvania. Three 12.5-mm discs were cut out, and the sample thicknesses were measured using calipers and the sample densities were measured using the Archimedes method. A thin layer of graphite was then applied to both sides of the samples. Using the Netszch LFA 467 HyperFlash instrument, the diffusivity for each sample is determined. The product of the density, specific heat, and diffusivity equals the thermal conductivity of the sample.

Thermal Conductivity Measurement Method 2—TIM Tester

The thermal conductivities were obtained by the steady state guarded heater method following ASTM D5470-17 "Standard Test Method for Thermal Transmission Properties of Thermally Conductive Electrical Insulation Materials" (2013) ASTM International, West Conshohocken, Pennsylvania. An AnalysisTech TIM Tester 1400 was used to measure the sample. Three-33 mm discs were punched out of the material and the thermal impedance was measured in the TIM Tester by first measuring one sample then stacking two samples and finally a stack of three samples. Plotting the impedance versus stack thickness and using a linear regression analysis, a slope to the curve is obtained. The inverse of this slope is the thermal conductivity of the sample without contributions from contact resistance as dictated by ASTM D5470-17.

Viscosity Measurement

Samples were measured on a rheometer (ARES G2, TA Instrument, New Castle, Delaware) using a 25 mm parallel plate geometry. The gap varied depending on the amount of sample loaded, but typically ranged around 1.5 mm Measurements were made at 25° C. and at a shear rate of 0.5 $s^{-1}$.

Laser Scattering Particle Size Analyzer

Size distributions for materials that were measured by laser scattering using a particle size analyzer (Microtrac S3500, Microtrac MRB, Montgomeryville, Pennsylvania). A dispersion of the given material was made in water at roughly 0.3 weight percent (wt. %) solids for the various materials. These dispersions were added a measurement cell. This addition was done until the transmittance was between the recommended levels for the instrument. The standard algorithm in the supplied software was used to for determining the distribution based on the scattering measurements.

Example E1-A (ATH-on ATH)

Figure 3:
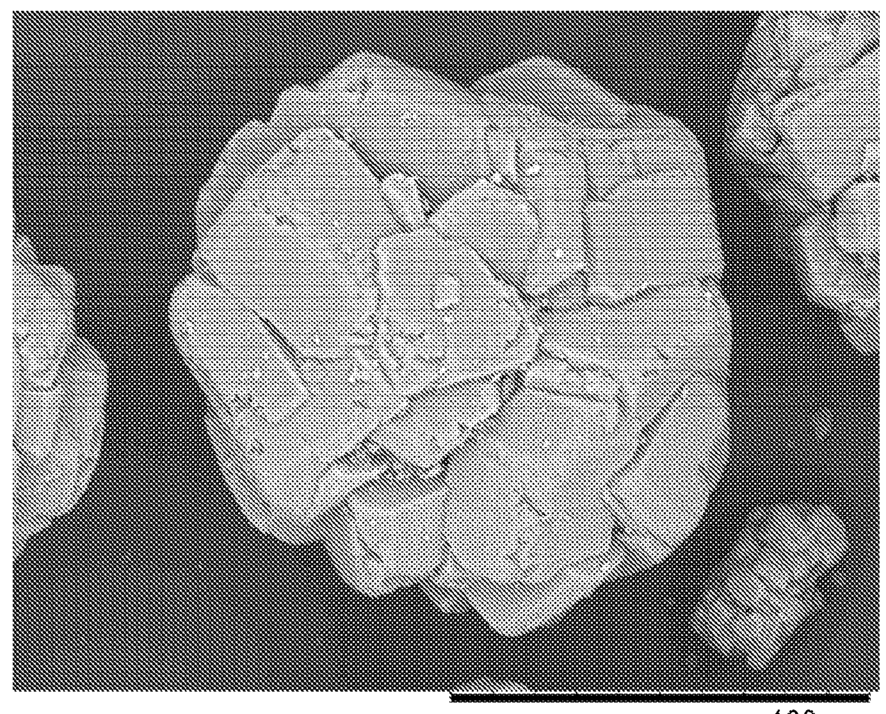
FIG. 3 is a scanning electron micrograph of SB93 aluminum trihydroxide (ATH) particles.
Figure 4:
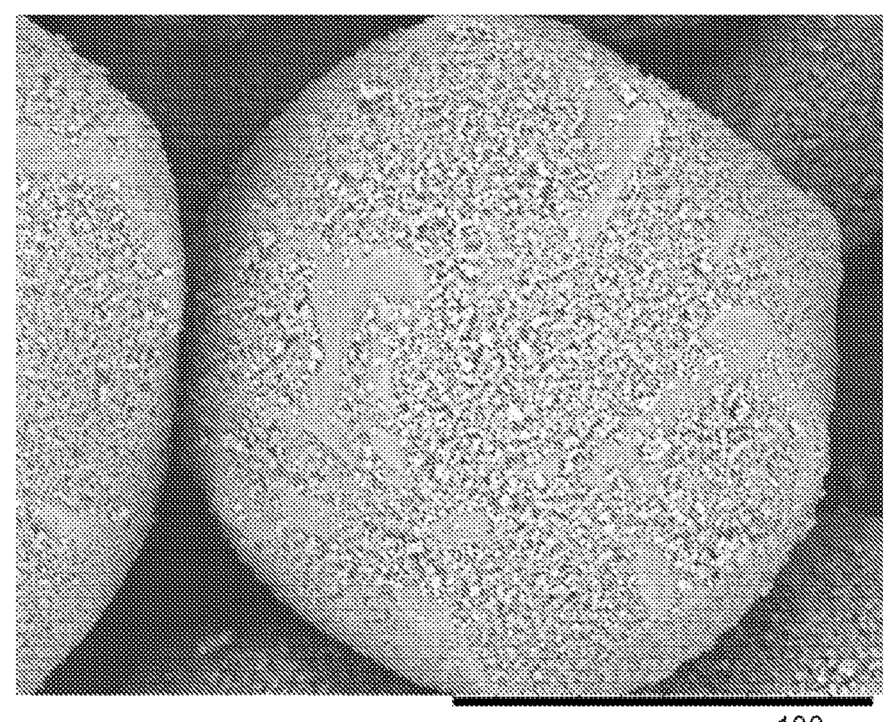
FIG. 4 is a scanning electron micrograph of decorated SB93 ATH particles made in Example E1-A.

Decorated ATH particles were formed by coating 20-100 microns ATH particles with a polymer binder and relatively small (decorating) particles of KH101 on SB93 inorganic core particles (shown in FIG. 3, illustrating the presence of crevices in the uneven outer surface of the SB93 particle). SB93 particles (9.0 g) were mixed with 0.33 g of a 10:1 mixture of DER332 and TEPA using a high shear mixing system at 1200 rpm for 1 min. KH-101 (1.0 g) was added into the mixture and blended through high shear mixer. The resulting powder was heated for 1 h in a convection oven at 60° C. The resulting decorated particles are shown in FIG. 4, illustrating the level-filling of the crevices of the SB93 particle core with the polymer binder retaining decorating particles of KH101.

Figure 5:
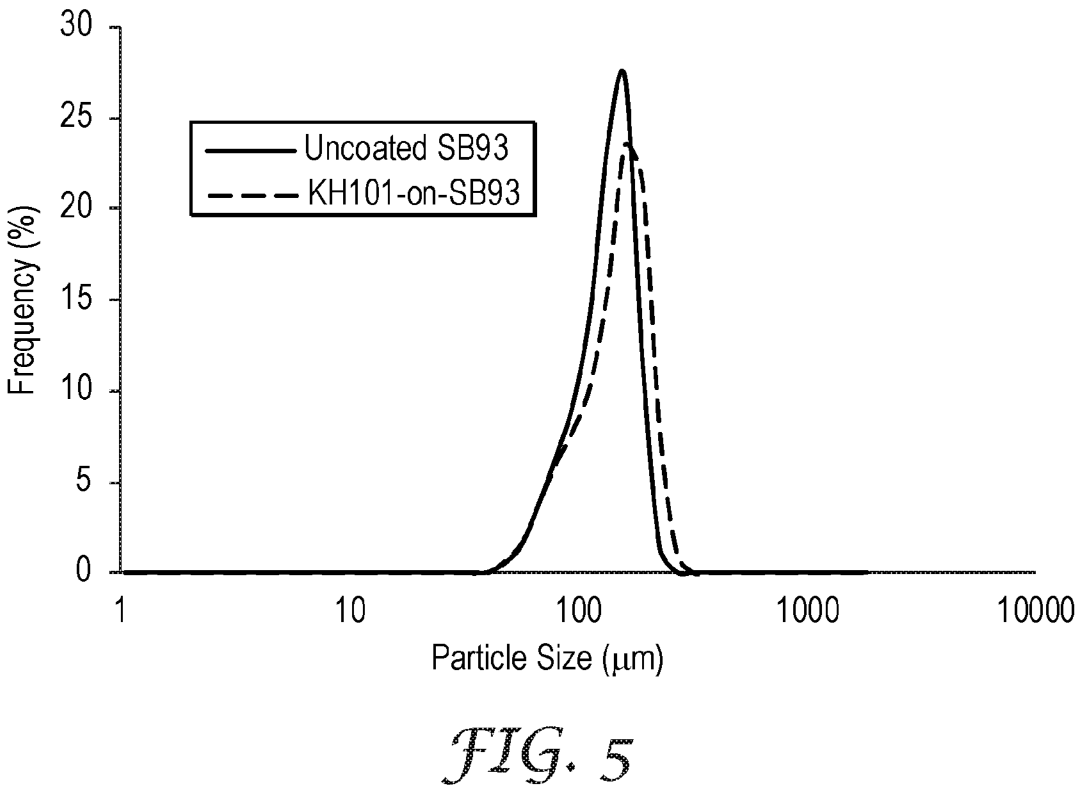
FIG. 5 is a particle size distribution plot of ATH and decorated ATH particles in Example E1-A.

The particle size distribution of the resulting decorated particles was similar to that of the original ATH core particle, SB93 (see FIG. 5).

Form factor and roundness values for decorated SB93 (0.84 and 0.77, respectively) were higher than those of SB93 (0.68 and 0.72, respectively).

Example E1-B (ATH-on-ATH)

Decorated ATH particles were formed by coating 20-100 microns ATH particles with a polymer binder and relatively small (decorating) particles of ATH indicated in Table 2. SB93 (core) particles (9.0 g) were mixed with 0.33 g of a 1:9 ratio of HDDA and EHA containing 0.15 wt. % of AIBN using a high shear mixer under the same conditions as Example E1-A. One gram of KH101 was added into the mixture and blended through high shear mixing system at the same condition. The resulting powder was heated for 1 h in a convection oven at 100° C.

The resulting material shape was substantially the same as Example E1-A.

Example E2-A (ATH-on-ATH)

Figure 6:
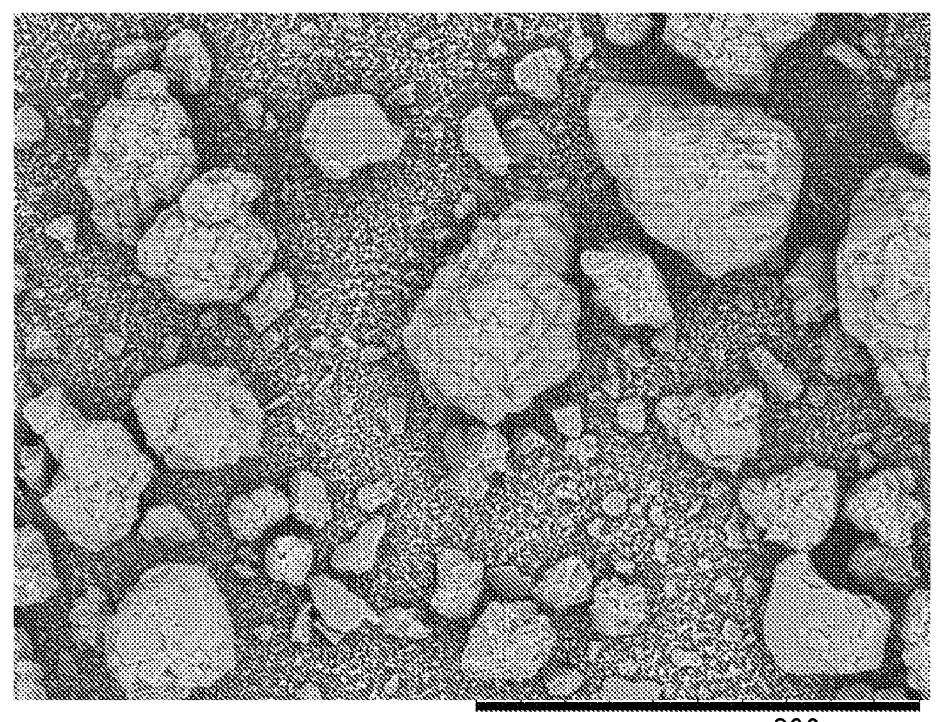
FIG. 6 is a scanning electron micrograph of A110 ATH particles.
Figure 7:
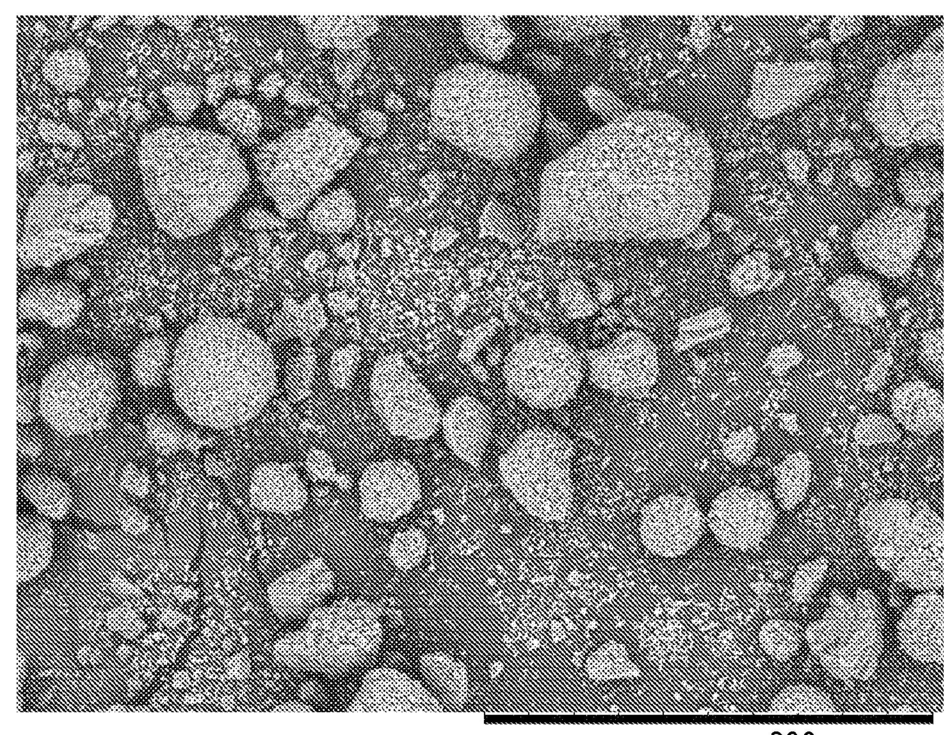
FIG. 7 is a scanning electron micrograph of decorated A110 ATH particles made in Example E6.

Acrylate binder was prepared by mixing HDDA and EHA in 1:9 ratio with 0.15 wt. % AIBN. 10.0 g of A110 particles (shown in FIG. 6), comprising both core and decorating particles, having a particle size distribution with 80% less than 44 microns and 43% smaller than 10 microns, were mixed with 0.33 g of acrylate binder through high shear mixing system at 1200 rpm for 1 min. The resulting powder was heated for 1 h in a convection oven at 100° C. As shown in FIG. 7, coated A110 were globular shaped particles, which is distinctive from the angular original A110 particles.

Example E3-A ($Al_2O_3$-on-ATH)

Figure 8:
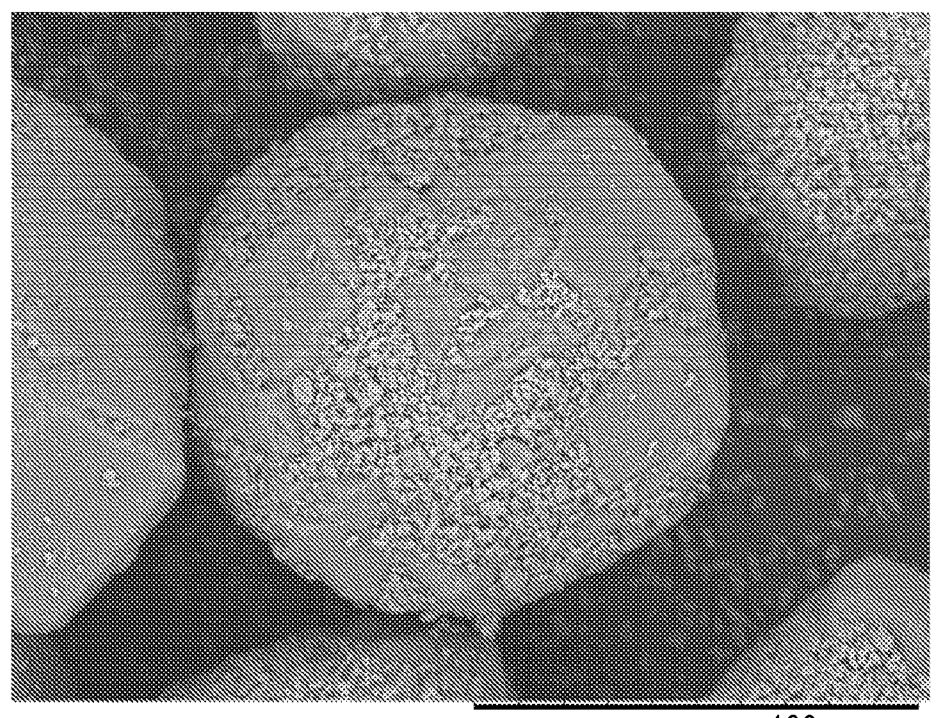
FIG. 8 is a scanning electron micrograph of TM1250 alumina disposed on SB93 ATH.

SB93 (core) particles (9.0 g) were mixed with 0.36 g of a mixture of DER332 and TEPA in a 10:1 ratio using a high shear mixer at 1200 rpm for 1 min. TM1250 (2.2 g) was added into the mixture and blended through high shear mixing system at the same condition. The resulting powder was heated for 1 h in convection oven at 60° C., resulting in globular shaped particles with crevices filled with TM1250 (decorating) particles, as shown in FIG. 8.

Example E3-B (BN on ATH)

Figure 9:
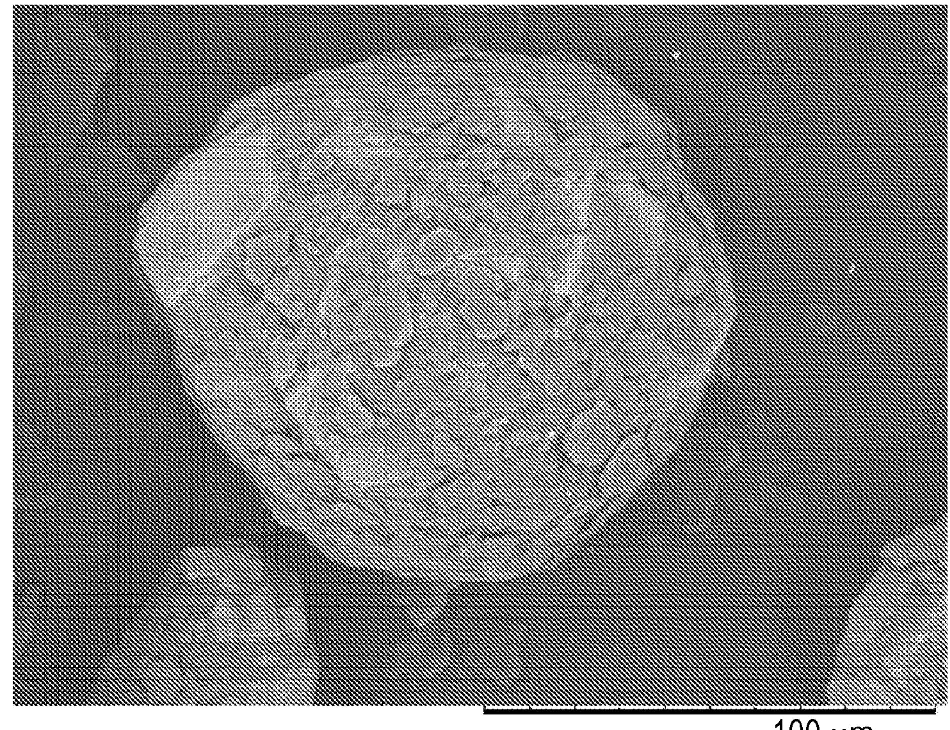
FIG. 9 is a scanning electron micrograph of BN boron nitride disposed on SB93 ATH.

SB93 (core) particles (9.0 g) were mixed with 0.36 g of a mixture of DER332 and TEPA in a 10:1 ratio using a high shear mixer at 1200 rpm for 1 min. CFP0075 (0.9 g) (decorating particles) was added into the mixture and blended using a high shear mixer under the same conditions as Example E2-A. The resulting powder was heated for 1 h in convection oven at 60° C., resulting in globular shaped particles with crevices filled by BN plates, as shown in FIG. 9

Example E4 (BN-on-ATH with LITHSIL)

180 g of SB93 (core) particles and 18 g of CFP0075 (decorating particles) were mixed with 20 g of LITHSIL solution, which was prepared by mixing 16 g of 25% LITHIL solution with 10 g of distilled water. The resulting powder was dried for 12 h in a convection oven at 110° C. The resulting particles were shaped substantially similar to those in Example E3-B.

Examples E5 and E6 and Comparative Examples CE1 and CE2: Thermal Interface Material Composite Made of ATH-on-ATH Epoxy composite of SB93 and KH101-on-SB93 (decorated particles) samples were prepared using monomodal and trimodal compositions as reported in Table 2. In the case of the trimodal filler, the volume ratio was 3:1:1. For a specific example, in the case of coated trimodal 75 vol. %, 50.31 g of KH101-on-SB93, 19.35 g of BF083, 7.74 g of BF013 were added into the mixture of 10.93 g of DER 332 and 1.67 g of TEPA. Then, the sample was mixed using a high shear mixer under vacuum. The resulting material was poured on a silicone sheet, metered with a notch bar having a nominal coating thickness of 0.762 mm, then cured at 70° C. for 30 min.

The thermal conductivity of epoxy-based composite samples was measured by LFA. In the case of a monomodal composite, coated ATH sample showed higher thermal conductivity value than uncoated ATH sample. On the other hand, in the case of a trimodal composition, the coated particle composite showed similar value compared to that of uncoated composite.

TABLE 2

| EXAMPLE | DESCRIPTION | VOL. % OF FILLER IN SECOND BINDER | FILLER | THERMAL CONDUCTIVITY, W/mK |
|---|---|---|---|---|
| CE1 | Uncoated Monomodal | 60 | SB93 | 1.38 |
| E5 | Coated Monomodal | 60 | KH101-on-SB93 | 1.67 |
| CE2 | Uncoated Trimodal | 75 | SB93, BF083, BF013 | 2.84 |
| E6 | Coated Trimodal | 75 | KH101-on-SB93, BF083, BF013 | 2.83 |

Comparative Examples CE3-CE7 and Examples E7-E11: Thermal Interface RICON Composite Material Made of ATH-on-ATH RICON composite samples were prepared by part A and B, using monomodal and trimodal compositions as reported in Table 3 and 4. In the case of trimodal composition in Table 3, the ratio of SB93 (KH101-on-SB93):BAK10:BAK2 in filler package was 3:1:1 by volume.

For a specific example, a Part A was prepared by mixing 20 g of RICON, 2 g of EFKA PL 5635, 80 g of coated A110, and 0.5 g of R805 using high shear mixer under vacuum condition.

For a specific example, a Part B was prepared by mixing 3 g of PRIPOL 2033, 1 g of FARMIN D2098, 1 g of EFKA PL 5635, 1 g of BYK108, 90 g of coated A110 particles, 0.5 g of R805 using high shear mixer under vacuum condition.

For preparing thermal conductivity measurement, Part A and B were mixed in 1:1 volume ratio using high shear mixer under vacuum condition. The resulting martial was poured on a silicone sheet, metered with a notch bar with 0.762 mm, then cured at 25° C. for 14 h.

As shown in Table 3, KH101-on-SB93 part A composites (E7 and E8) showed much lower viscosity at 0.5 $s^{-1}$ shear rate for both monomodal and trimodal composition compared to SB93 composites (CE3 and CE4).

Table 4 reports compositions of uncoated and coated A110 ATH with different vol. % of RICON with viscosity and thermal conductivity values. The viscosity value was obtained in part A while the thermal conductivity was obtained by cured Part A and B mixture. As shown in Table 4, coated A110 part A composite samples (E9-E11) showed much lower viscosity in all cases as compared to A110 composite samples (CE5-CE7). On the other hand, the thermal conductivity of coated A110 composite was similar to that of A110 composite.

TABLE 3

| EX. | DESCRIPTION | VOLUME PERCENT OF FILLER IN PART A | FILLER | VISCOSITY of Part A at SHEAR RATE = 0.5 $s^{-1}$, Pa · S at 25° C. |
|---|---|---|---|---|
| CE3 | Uncoated/Monomodal | 60 | SB93 only | 1804 |
| E7 | Coated/Monomodal | 60 | KH101-on-SB93 only | 361 |
| CE4 | Uncoated/Trimodal | 80 | SB93, BAK10, BAK2 | 3801 |
| E8 | Coated/Trimodal | 80 | KH101-on-SB93, BAK10, BAK2 | 1029 |

TABLE 4

| EX. | DESCRIPTION | VOL. % OF FILLER IN PART A | FILLER | VISCOSITY OF PART A COMPOSITE AT SHEAR RATE 0.5 $s^{-1}$, Pa · S at 25° C. | THERMAL CONDUCTIVITY, W/m · K |
|---|---|---|---|---|---|
| CE5 | Uncoated 60 vol % | 60 | A110 | 1075 | 2.04 |
| CE6 | Uncoated 65 vol % | 65 | A110 | 1936 | 2.4 |
| CE7 | Uncoated 70 vol % | 70 | A110 | 4829 | 2.41 |
| E9 | Coated 60 vol % | 60 | Coated A110 | 547 | 1.98 |
| E10 | Coated 65 vol % | 65 | Coated A110 | 859 | 2.26 |
| E11 | Coated 70 vol % | 70 | Coated A110 | 1300 | 2.45 |

All cited references, patents, and patent applications in this application that are incorporated by reference, are incorporated in a consistent manner. In the event of inconsistencies or contradictions between portions of the incorporated references and this application, the information in this application shall control. The preceding description, given in order to enable one of ordinary skill in the art to practice the claimed disclosure, is not to be construed as limiting the scope of the disclosure, which is defined by the claims and all equivalents thereto.

What is claimed is:

1. A decorated particle comprising:

a single inorganic particle core having an average particle diameter of 20 to 150 microns, wherein the inorganic particle core comprises aluminum trihydroxide, and wherein the inorganic particle core has an uneven outer surface with a plurality of crevices;

a first binder retaining decorating particles disposed on at least a portion of the outer surface of the inorganic particle core and filling the crevices, wherein the decorating particles have an average particle diameter of 0.05 to 10 microns, and wherein the first binder is inorganic.

2. The decorated particle of claim 1, wherein the inorganic particle core and the decorating particles are thermally conductive.

3. The decorated particle of claim 1, wherein the single inorganic particle core has an outer surface, wherein the decorated particle has an outer surface, and wherein the outer surface of the decorated particle is smoother than the outer surface of the inorganic particle core.

4. The decorated particle of claim 1, wherein the inorganic particle core and the decorating particles do not have the same composition.

5. The decorated particle of claim 1, wherein the decorating particles have an average particle diameter of 0.5 to 7 microns.

6. A plurality of decorated particles according to claim 1.

7. A composite material comprising the plurality of decorated particles of claim 6, retained in a second binder, wherein the second binder is distinguishable from the first binder.

8. A method for making the decorated particle of claim 1, the method comprising:

combining:

the single inorganic particle core;

a curable first binder precursor; and the decorating particles; and curing the curable first binder precursor to form a first binder, thereby forming the decorated particle.

9. The method of claim 8, wherein the single inorganic particle core and the decorating particles are thermally conductive.

10. The method of claim 8, wherein the single inorganic particle core has an outer surface, wherein the decorated particle has an outer surface, and wherein the outer surface of the decorated particle is smoother than the outer surface of the inorganic particle core.

* * * * *